US009823544B2

(12) United States Patent
McIntyre et al.

(10) Patent No.: US 9,823,544 B2
(45) Date of Patent: Nov. 21, 2017

(54) METHOD AND SYSTEM FOR CONTROLLING STRAY LIGHT REFLECTIONS IN AN OPTICAL SYSTEM

(71) Applicant: DRS RSTA, INC., Melbourne, FL (US)

(72) Inventors: Kevin J. McIntyre, West Melbourne, FL (US); Brian R. Pekarek, Fairview, TX (US); Mark E. Durham, Palm Bay, FL (US); Ken Pietrasik, Murphy, TX (US)

(73) Assignee: DRS Network & Imaging Systems, LLC, Melbourne, FL (US)

( * ) Notice: Subject to any disclaimer, the term of this patent is extended or adjusted under 35 U.S.C. 154(b) by 149 days.

(21) Appl. No.: 14/206,186

(22) Filed: Mar. 12, 2014

(65) Prior Publication Data
US 2015/0277077 A1 Oct. 1, 2015

Related U.S. Application Data

(60) Provisional application No. 61/782,834, filed on Mar. 14, 2013.

(51) Int. Cl.
*G03B 11/04* (2006.01)
*G02B 27/00* (2006.01)
*G02B 7/02* (2006.01)

(52) U.S. Cl.
CPC .............. *G03B 11/045* (2013.01); *G02B 7/02* (2013.01); *G02B 27/0012* (2013.01); *G02B 27/0018* (2013.01); *Y10T 29/49826* (2015.01)

(58) Field of Classification Search
CPC . G02B 5/00; G02B 5/003; G02B 7/00; G02B 7/02–7/105; G02B 27/00;
(Continued)

(56) References Cited

U.S. PATENT DOCUMENTS 6,538,736 B1 * 3/2003 Palumbo ................... G01J 3/02
356/326
2005/0088748 A1 4/2005 Otteman
(Continued)

OTHER PUBLICATIONS

International Search Report and Written Opinion for Application No. PCT/US2014/024911 dated Aug. 27, 2014.

*Primary Examiner* — Stephone B Allen
*Assistant Examiner* — James McGee
(74) *Attorney, Agent, or Firm* — Kilpatrick Townsend & Stockton LLP (57) ABSTRACT

Systems and methods for controlling stray light reflections are provided. An optical system includes an aperture having an optical axis passing therethrough, one or more optical elements disposed along an optical path, and a detector disposed along the optical path. The system further includes an optical housing disposed between the aperture and the detector. The interior surface of the optical housing includes a predetermined surface feature adapted to control reflections of stray light along the optical path between the aperture and the detector. A method of fabricating an optical housing includes forming a pattern comprising a predetermined surface feature on an interior surface of the optical housing. The predetermined surface feature is configured to control reflections of stray light along an optical path between an aperture at a proximal end of the optical housing and a detector at a distal end of the optical housing.

5 Claims, 10 Drawing Sheets

(58) Field of Classification Search
CPC ................ G02B 27/0018; G03B 11/04; G03B 11/045–11/048; G03B 17/12–17/14; H04N 5/2254
USPC ........ 359/601, 611–614, 808, 819–830, 894; 396/529–534; 42/119, 122–123, 130–131
See application file for complete search history.

(56) References Cited

U.S. PATENT DOCUMENTS

| | | |
|---|---|---|
| 2007/0253050 A1 | 11/2007 | Kuribayashi |
| 2010/0128350 A1 | 5/2010 | Findlay et al. |
| 2010/0264252 A1 | 10/2010 | Preston et al. |
| 2012/0281196 A1 | 11/2012 | Loering et al. |
| 2013/0010377 A1* | 1/2013 | Okuyama .......... G02B 27/0018 359/819 |

\* cited by examiner

METHOD AND SYSTEM FOR CONTROLLING STRAY LIGHT REFLECTIONS IN AN OPTICAL SYSTEM

CROSS-REFERENCES TO RELATED APPLICATIONS

This application claims priority to U.S. Provisional Patent Application No. 61/782,834, filed Mar. 14, 2013, entitled "Method and System for Controlling Stray Light Reflections in an Optical System," the disclosure of which is hereby incorporated by reference in its entirety for all purposes.

BACKGROUND OF THE INVENTION

Optical systems are used with optical devices such as cameras, telescopes, and microscopes. In an optical system, stray light is light which was not intended in the design. Stray light may be from an intended source, but follow paths other than intended. Stray light can also originate from a source other than the intended source. Stray light can enter into a lens from a peripheral source, which can be a light source coming from outside the expected field of view. One example of stray light is sunlight outside a field of view of an optical lens. Stray light can result in unwanted background noise or signals relative to the intended image. Thus, stray light can interfere with an intended image. Stray light can also limit the dynamic range of an optical system. For example, stray light can limit the signal-to-noise ratio or contrast ratio of an optical system, by limiting how dark the optical system can be.

Therefore, there is a need in the art for improved methods and systems to reduce or minimize the amount of stray light in optical systems.

SUMMARY OF THE INVENTION

Embodiments of the present invention relate generally to optical systems. More specifically, embodiments of the present invention relate to methods and systems for reducing stray light in optical systems. Merely by way of example, the present invention has been applied to a method and system for forming a modified thread pattern on the internal surface of an optical housing (e.g., a lens hood) that reduces scattering of stray light. Some embodiments utilize an operating principle that is reflective in nature. Accordingly, embodiments of the present invention are applicable to all commonly used wavelengths of light in a variety of optical systems.

According to an embodiment of the present invention, an optical system is provided. The optical system includes an aperture (e.g., an input aperture) having an optical axis passing therethrough and one or more optical elements disposed along an optical path. The optical system also includes a detector disposed along the optical path and an optical housing disposed between the aperture and the detector. The optical housing can also be referred to as an optical cover or a lens barrel. An interior surface of the optical housing includes a predetermined surface feature adapted to control reflections of stray light along the optical path between the aperture and the detector. The predetermined surface feature can include a series of mechanical structures arranged substantially transverse to the optical axis. The series of structures can be characterized by a symmetric or non-symmetric pattern. These patterns include, without limitation, a sawtooth pattern, a rounded sawtooth pattern, a seagull pattern, combinations thereof, or the like. For symmetric patterns, the individual structures have symmetric geometries. In certain embodiments, non-symmetric patterns include an upstream surface facing toward the aperture that is characterized by a first surface feature and a downstream surface facing toward the detector that is characterized by a second surface feature differing from the first surface feature. For example, according to these embodiments, the first surface feature of a non-symmetric pattern can be curved and the second surface feature can be substantially planar or planar. According to one embodiment of the present invention, a non-symmetric pattern is a half-sawtooth and half-curved pattern. Individual structures comprising such non-symmetric patterns have asymmetric geometries.

According to another embodiment of the present invention, a method of fabricating an optical housing is provided. The method includes forming a pattern of geometric structures on an interior surface of the optical housing. The pattern of structures comprises a predetermined surface feature configured to control reflections of stray light along an optical path between the aperture and the detector. In some embodiments, the pattern is fabricated on an object, which can be referred to as an "insert," that is inserted into the optical housing. Thus, embodiments in which the pattern is fabricated directly on the optical housing, as well as on an insert disposed inside the optical housing, are included within the scope of the present invention.

According to yet another embodiment of the present invention, a method of designing an optical housing is provided. The method includes providing an optical lens assembly comprising an optical housing and receiving a selection of a shape of an internal structure to be included in a pattern disposed on an internal surface of the optical housing. The shape of the internal structure can be selected from a plurality of defined shapes having respective, predetermined surface features. The method computes, based on the shape of the internal structure and properties of components of the optical lens assembly, light intensity at a detector. The method then determines if the light intensity exceeds a threshold. If the intensity does not exceed the threshold, the design of the optical housing is fixed to include the selected shape of the internal structure. Otherwise, if the intensity exceeds the threshold, the shape of the internal structure is iteratively modified and the light intensity is re-computed based on the modified shape until the intensity no longer exceeds the threshold.

Numerous benefits are achieved by way of the present invention over conventional techniques. For example, embodiments of the present invention reduce stray light in optical systems and improve the perceived image quality by reducing unwanted background noise or signals relative to the intended image. Also, for example, embodiments of the present invention reduce stray light from sources that, while outside of a field of view of a lens, reach the front of the lens. Stray light can enter into lenses from peripheral sources, which can be any source of light coming from outside the expected field of view and interfering with an intended image. Some conventional optical systems include lens barrels having smooth or planar surfaces. Such smooth and planar surfaces reflect stray light rays within conventional optical systems, which results in problems stemming from unwanted background noise or signals relative to the intended image. In contrast to such conventional optical systems, embodiments of the present invention reduce stray light by incorporating surface features into internal surfaces of a lens barrel. These and other embodiments of the invention along with many of its advantages and features are described in more detail in conjunction with the text below and attached figures.

DETAILED DESCRIPTION OF SPECIFIC EMBODIMENTS

Embodiments of the present invention provide features that can be machined, formed, molded, or otherwise fabricated in the interior surfaces of an optical assembly, providing the function of reducing unwanted reflections, which can be referred to as "stray light" within the interior surfaces of the optical assembly. The features includes a mechanical structure, usually in a circular pattern, with a predetermined shape that re-directs light energy ultimately away from the primary image plane or detector location. Shapes include threadlike patterns with surfaces that are shaped or curved in a specific manner to control the direction and spread of the reflected beam. According to embodiments, the features may be helical (i.e., akin to a screw thread). In alternative or additional embodiments, the features can have a circular geometry.

As illustrated in FIG. 1A-FIG. 5, embodiments of the present invention utilize unique shapes of threadlike profiles that efficiently diffuse stray light in a desired direction within an optical system. Embodiments avoid issues associated with standard thread patterns consisting of nominally flat surfaces, which in turn can result in excessive stray light energy reaching the image plane, particularly for specific incidence angles.

In an alternative embodiment, an optical system is provided that contains one or more emitters, for example, a display assembly. A display assembly can include an emitter and a lens assembly. A human eye is used to look into the display assembly to view a magnified image of the display. In such a system, stray light could arise from light leaving the emitter and reflecting/scattering off the interior wall of the housing. Accordingly, the use of embodiments of the present invention extends not only to include opto-electronic detectors (e.g., mid-infrared focal plane arrays and the like), but optical systems suitable for use by a human viewer. In some embodiments, the "image plane" 116 illustrated in FIG. 1 can be an object plane, with the housing including the pattern of internal structures disposed between the object plane and the user's eye.

In some implementations, optical elements are components that direct light beams and may include lenses, mirrors, prisms, gratings, and the like. An emitter is a light emitting component such as a display device that may include an array of pixels. The emission process for such display devices includes, but is not limited to, LCD (Liquid Crystal Display), OLED (Organic Light Emitting Diode) technology, and the like.

Figure 1:
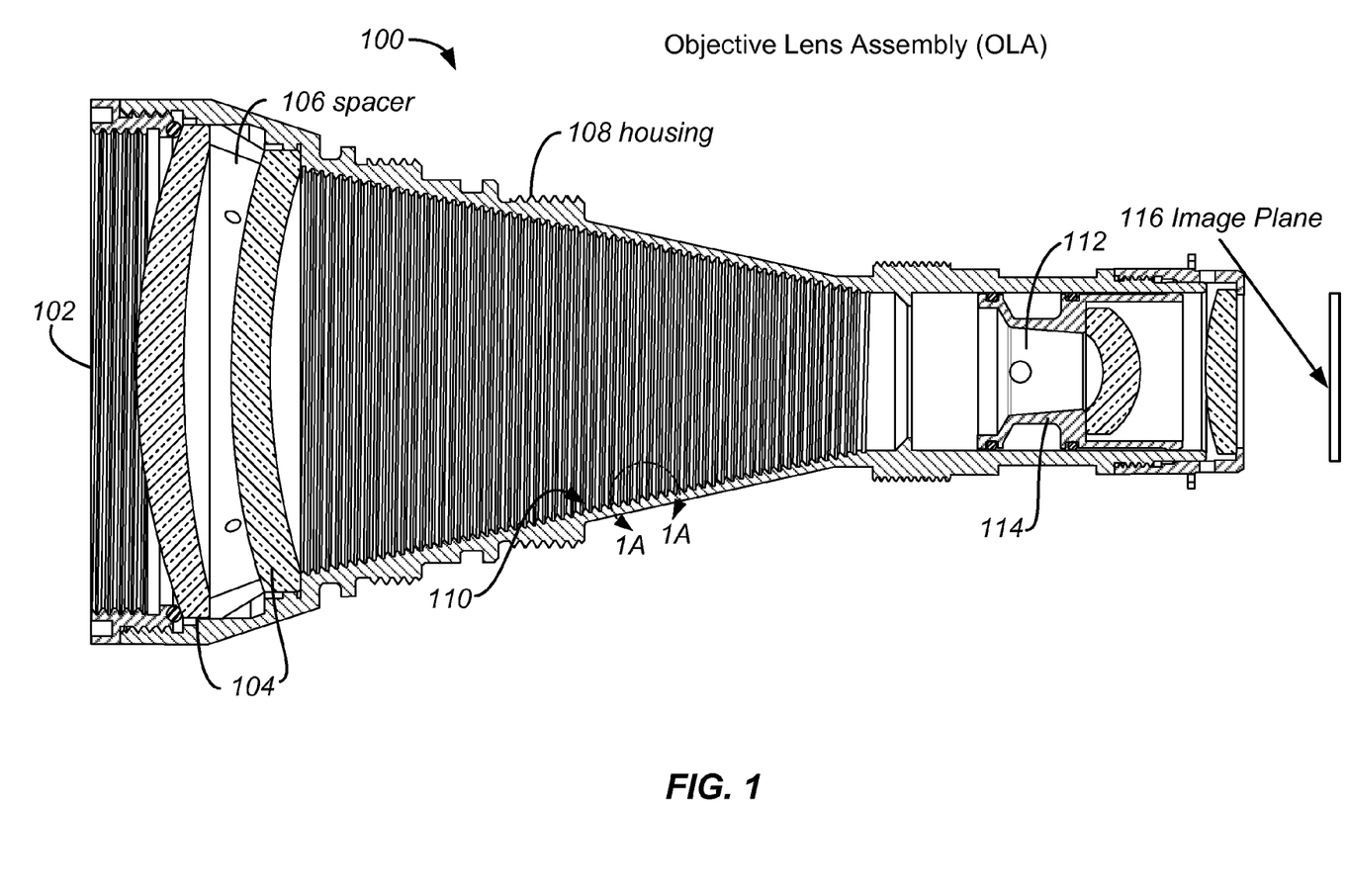
FIG. 1 is a cross sectional view of an objective lens assembly (OLA) according to an embodiment of the present invention.

FIG. 1 is a cross sectional view of an objective lens assembly (OLA) 100 according to one embodiment. In the illustrated embodiment, OLA 100 includes an input aperture 102 having an optical axis passing therethrough and one or more optical elements 104 disposed along an optical path between input aperture 102 and an image plane 116. In certain embodiments, optical elements 104 can be lenses separated by a spacer 106. As shown, OLA 100 includes an optical housing 108. Optical housing 108 can also be referred to as an optical cover or a lens barrel. In the exemplary embodiment shown in FIG. 1, optical housing 108 is conical. It should also be understood that embodiments of OLA 100 can include a cylindrical or substantially cylindrical optical housing 108.

OLA 100 includes internal structures 110 disposed on an internal surface of optical housing 108 between input aperture 102 and image plane 116. As described below with reference to FIG. 1A-FIG. 5, the internal structures 110 are mechanical structures shaped so as to reduce or minimize the amount of stray light reaching image plane 116. As shown in FIG. 1, housing 108 is disposed between input aperture 102 and image plane 116. Light from a scene gets passed through input aperture 102 on to image plane 116. However, at the same time, some stray light can get through to image plane 116, which is undesirable. Embodiments described herein reduce or minimize the amount of stray light that gets to image plane 116. According to embodiments, a detector measures an amount of light received at image plane 116 after entering input aperture 102 and being passed along the optical path via optical housing 108. For example, the detector can measure the intensity, or power, of light at image plane 116, including stray light entering input aperture 102 and being passed through optical housing 108 and intermediate aperture 112 of focus lens cell 114. As shown in the exemplary embodiments of FIGS. 6 and 7, in embodiments, the detector can measure the intensity of light arriving at image plane 116 in terms of watts per square centimeter. In additional or alternative embodiments, the detector measures the intensity of light from a scene in other units, such as, for example, watts per square meter. In certain embodiments, image plane 116 comprises the detector.

Figure 1A:
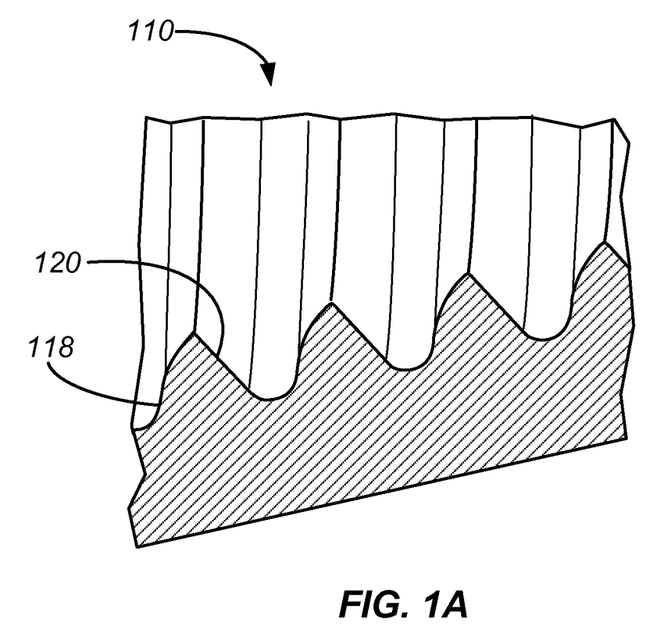
FIG. 1A depicts a perspective view of an internal structure of the OLA of FIG. 1 according to an embodiment of the present invention.

FIG. 1A depicts a perspective view of a portion of the example internal structures 110 shown in FIG. 1. As illustrated in FIG. 1A, internal structures 110 include a modified "sharktooth" geometry with a non-symmetric profile. The modified sharktooth geometry used for internal structures 110 includes an upstream surface 118 facing toward input aperture 102 that is characterized by a first surface feature and a downstream surface 120 facing toward the detector and image plane 116 that is characterized by a second surface feature differing from the first surface feature. In the example provided in FIG. 1A, the first surface feature of the modified sharktooth geometry is curved and the second surface feature can be substantially planar. Although the exemplary embodiment shown in FIG. 1A includes a convex first surface feature, it is to be understood that in alternative embodiments, the curved first surface feature can be concave.

FIGS. 2-5 provide cross sectional views of internal structures usable to control reflections of stray light, according to various embodiments of the present invention.

Figure 2:
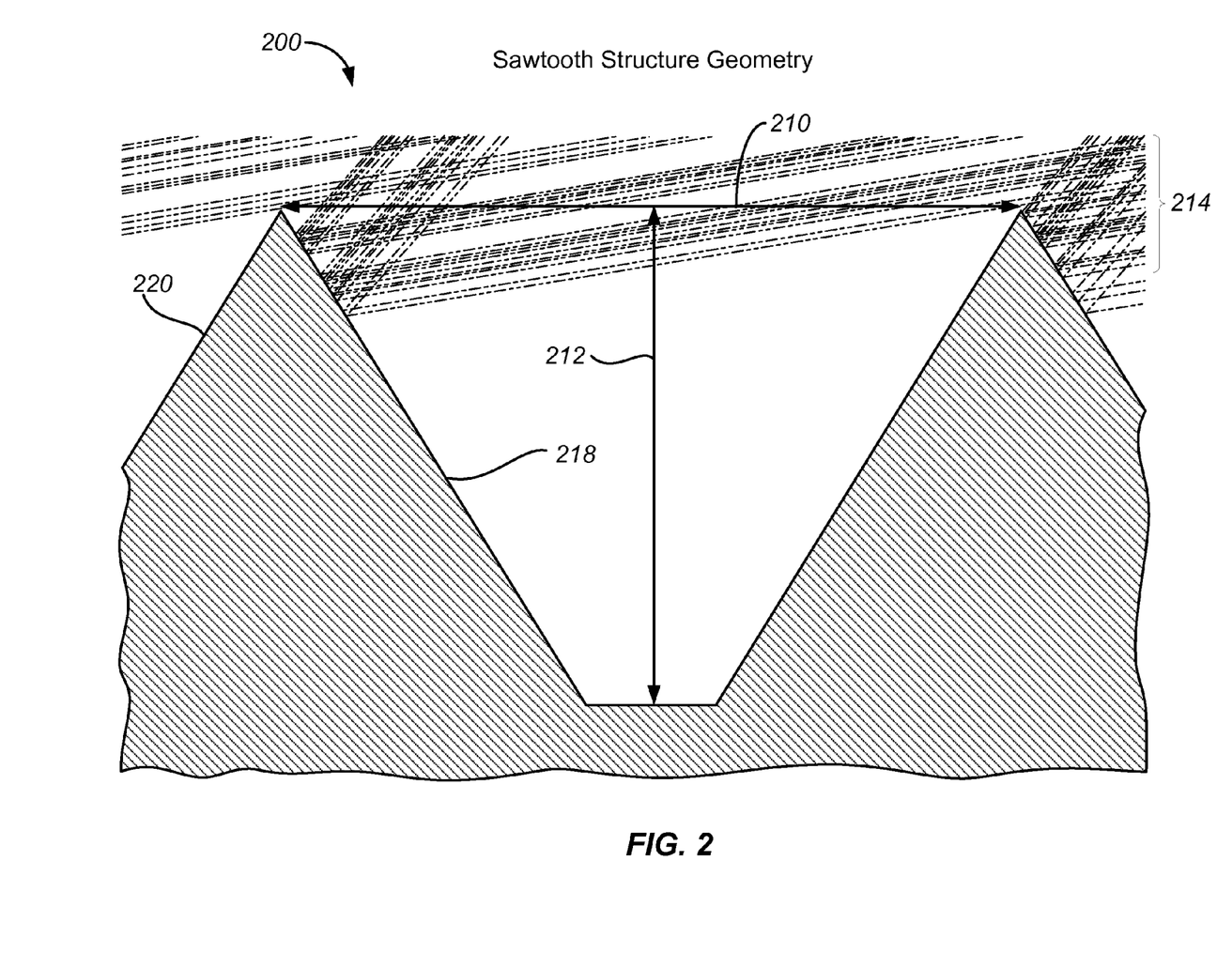
FIGS. 2-5 provide cross sectional views of internal structures usable to control stray light reflections, according to embodiments of the present invention.

FIG. 2 depicts a cross sectional view of a sawtooth structure geometry 200. As shown, sawtooth structure geometry 200 is a symmetric profile including planar surfaces forming triangular ridges spaced apart by a width 210 and separated by a trough with a depth 212. With continued reference to FIG. 1, sawtooth structure geometry 200 includes an upstream surface 218 facing toward input aperture 102 and a downstream surface 220 facing toward the detector and image plane 116. As seen in FIG. 2, each of surfaces 218 and 220 are planar surfaces. Upstream surface 218 is angled to control the direction and spread of stray light rays 214 so as to minimize reflection of stray light rays 214 in the downstream direction towards the detector. In one non-limiting embodiment, width 210 is 0.051 inches and depth 212 is 0.036 inches.

Figure 3:
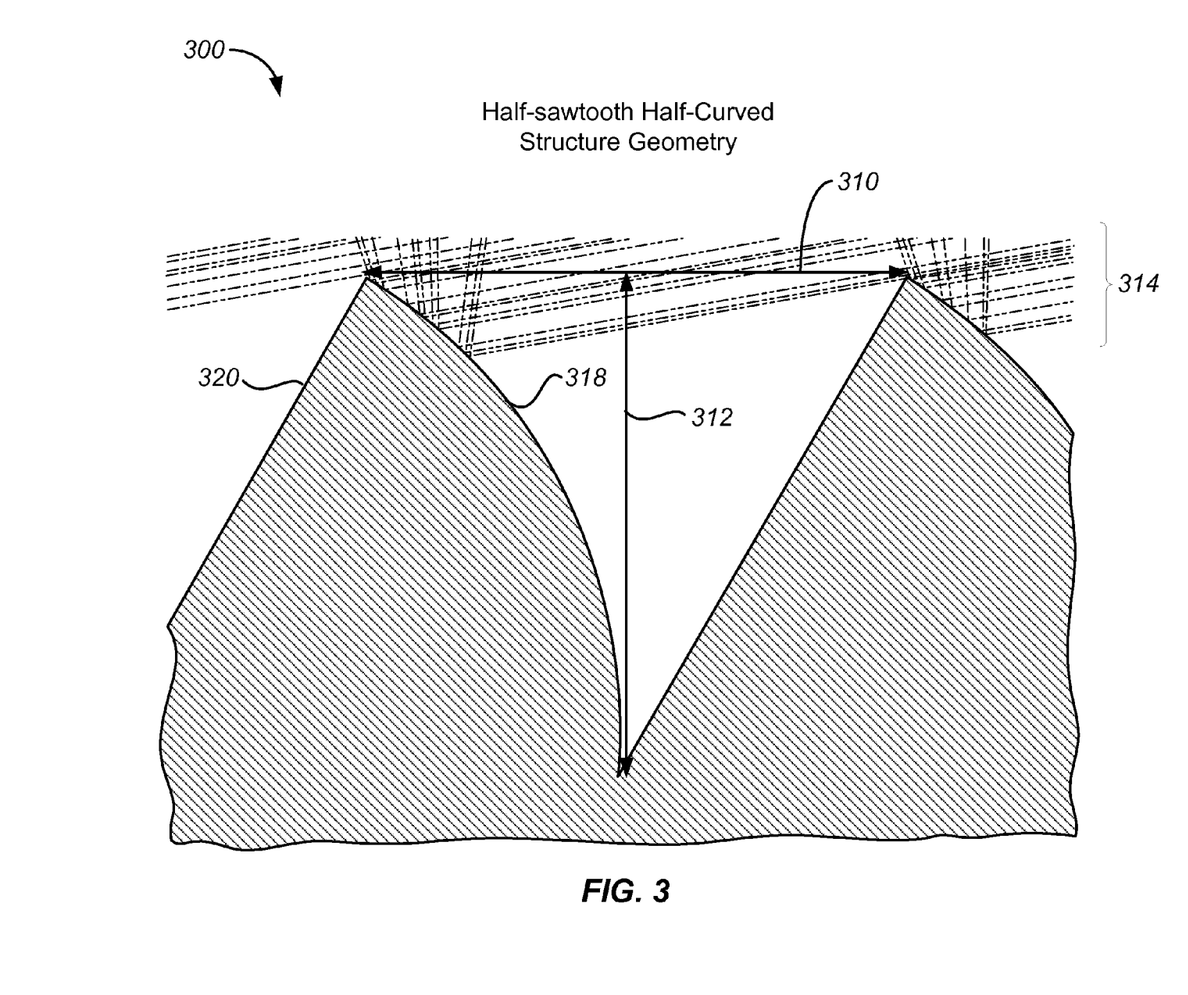

FIG. 3 depicts a cross sectional view of a half-sawtooth half-curved structure geometry 300. As shown, half-sawtooth half-curved structure geometry 300 is a non-symmetric profile including a curved upstream surface 318 and planar downstream surface 320 forming ridges resembling shark fins. The ridges are spaced apart by a width 310 and separated by a trough with a depth 312. Upstream surface 318 is curved to control the direction and spread of stray light rays 314 in order to minimize reflection of stray light rays 314 in the downstream direction towards the detector. According to a non-limiting embodiment, width 310 is 0.042 inches and depth 312 is 0.038 inches. Although the exemplary embodiment shown in FIG. 3 includes a convex curved upstream surface 318, it is to be understood that in alternative embodiments, the curved upstream surface 318 can be concave.

Figure 4:
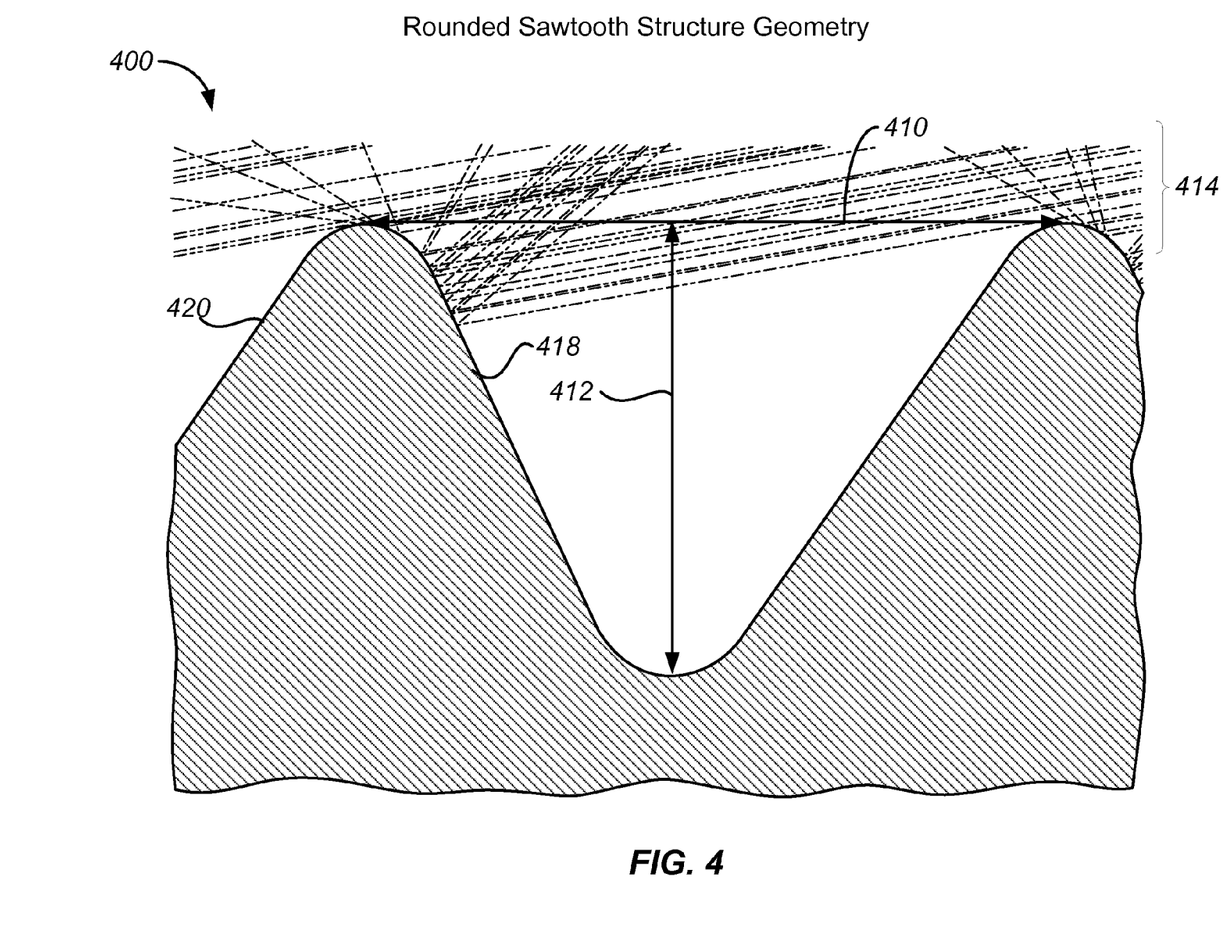

FIG. 4 depicts a cross sectional view of a rounded sawtooth structure geometry 400 having a symmetric profile including substantially planar upstream and downstream surfaces 418 and 420 forming ridges with rounded peaks. The ridges are spaced apart by a width 410 and separated by a trough with a depth 412. Upstream surface 418 is angled to control the direction and spread of incoming stray light rays 414 in order to minimize reflection of stray light rays 414 in the downstream direction towards the detector. In accordance with one exemplary embodiment, width 410 is 0.051 inches and depth 412 is 0.033 inches. According to embodiments of the present invention, the general shape of a pattern can be different at different points along the optical axis. For example, the half-sawtooth half-curved structure geometry 300 shown in FIG. 3 could be employed in the front half of a lens barrel or optical housing and the rounded sawtooth structure geometry 400 shown in FIG. 4 could be employed in the back half of the barrel or housing.

Figure 5:
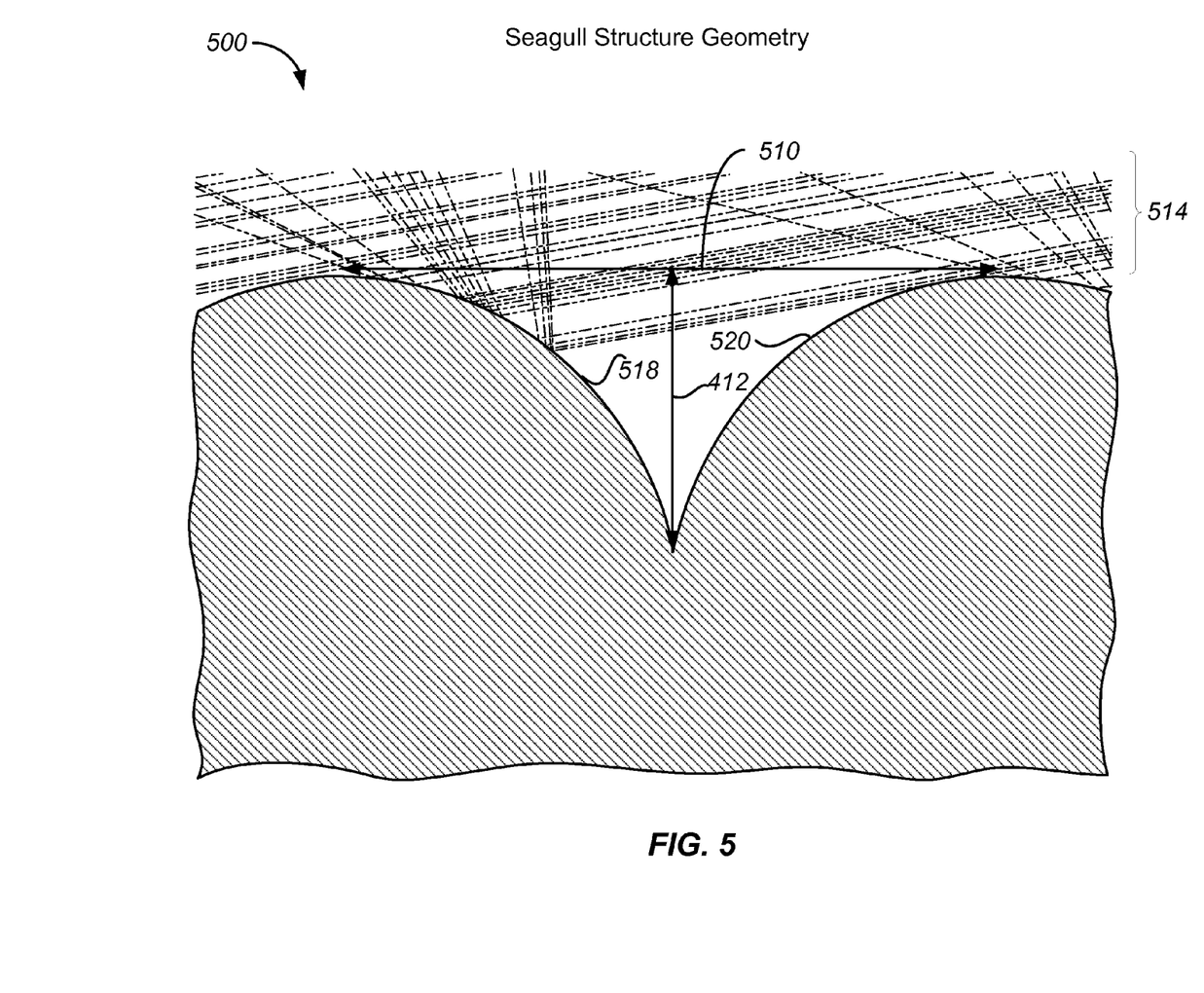

FIG. 5 depicts a cross sectional view of a seagull structure geometry 500. As shown, seagull structure geometry 500 has a symmetric profile including curved upstream and downstream surfaces 518 and 520 forming rounded ridges. The ridges are spaced apart by a width 510 and separated by a trough with a depth 512. Upstream surface 518 is curved so as to control the direction and spread of incoming stray light rays 514 by minimizing reflection of stray light rays 514 in the downstream direction towards the detector. According to one exemplary embodiment, width 510 is 0.051 inches and depth 512 is 0.021 inches. While the example embodiment shown in FIG. 5 includes convex curved upstream and downstream surfaces 518 and 520, it is to be understood that in alternative embodiments, one or more of curved upstream and downstream surfaces 518 and 520 can be concave.

Figure 6:
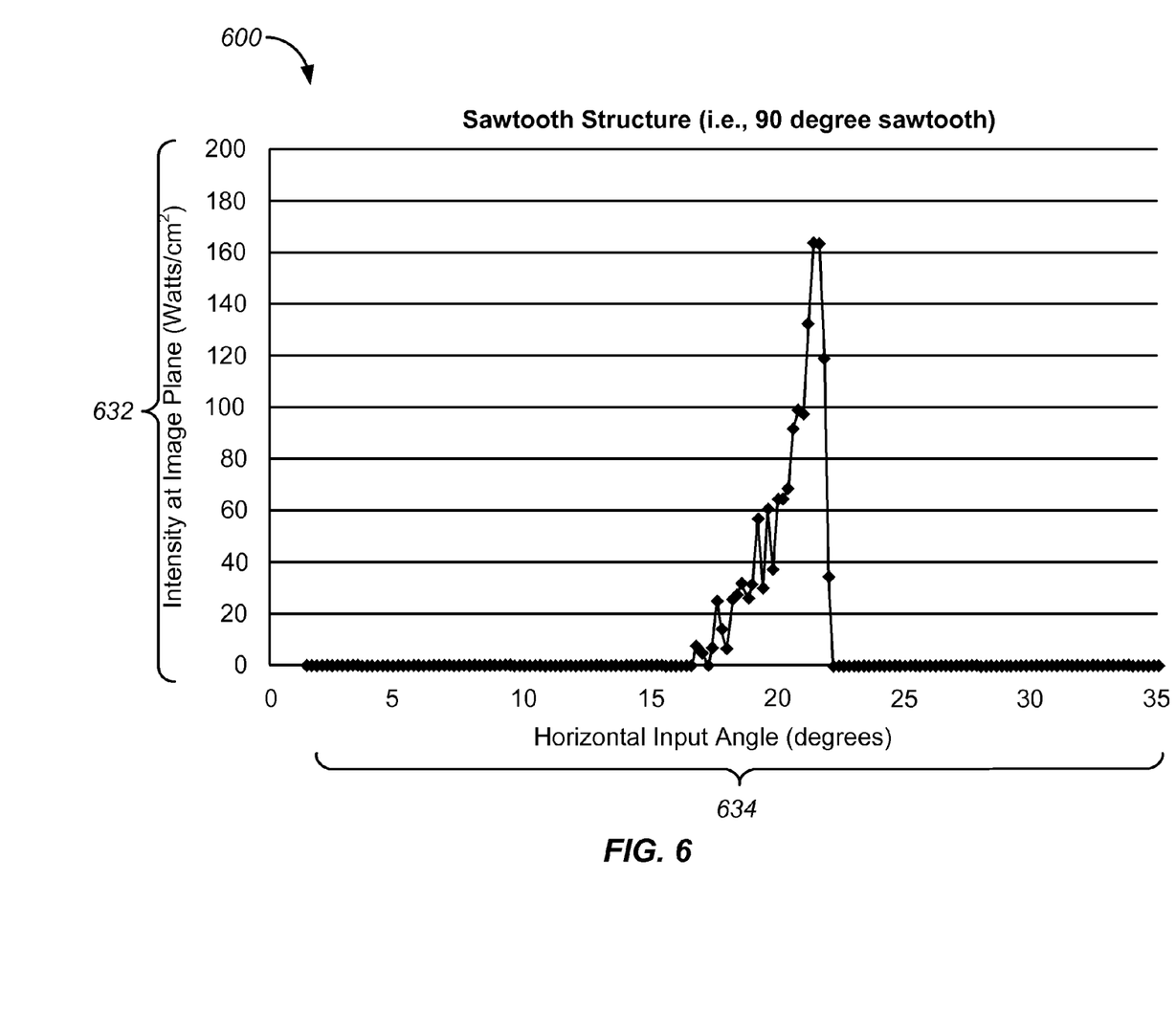
FIGS. 6 and 7 illustrate results of using exemplary internal structures to control stray light reflections, according to embodiments of the present invention.
Figure 7:
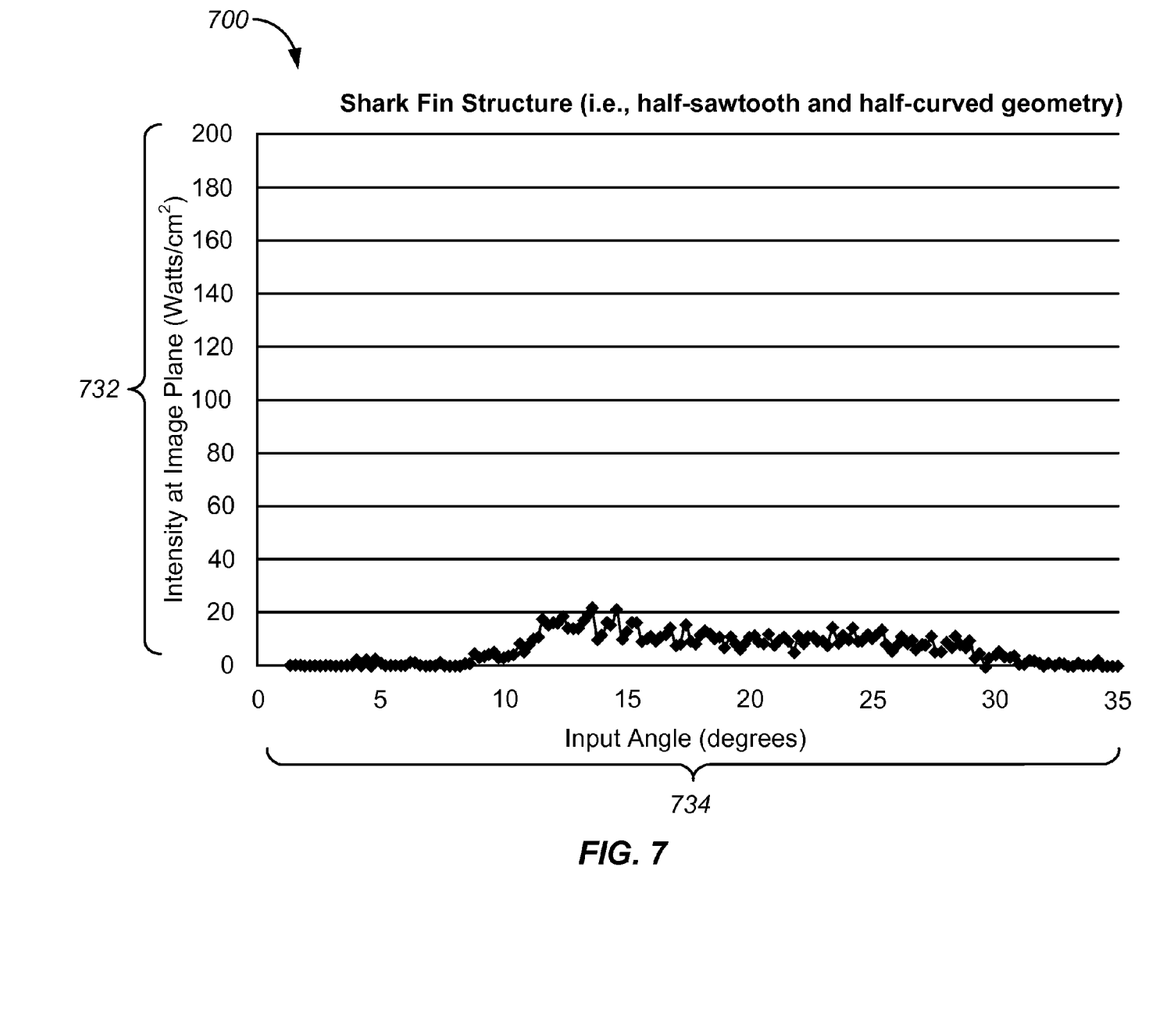

FIGS. 6 and 7 illustrate results of using exemplary internal structures to control stray light reflections within an optical system, according to embodiments. FIG. 6 provides a plot 600 showing the results of using a sawtooth structure geometry to control stray light in an optical system. In particular, plot 600 indicates the intensity of light 632 received at an image plane relative to horizontal input angles 634 of stray light beams when using a sawtooth geometry with a 90-degree angle for one of its surfaces. Horizontal input angles 634 are indicated in terms of degrees where the degrees indicate the angle of incidence of an incoming stray light beam, where the angle of incidence is the angle between the stray light beam and an interior surface of an optical housing. As shown, when employing the 90-degree sawtooth structure geometry, the amount of stray light reaching the image plane is minimal at most horizontal input angles 634. Plot 600 also shows that with the 90-degree sawtooth structure geometry, when the horizontal input angle 634 of a stray light beam is between 20 and 22 degrees, the amount of stray light reaching the image plane is relatively high. In optical systems where angles of incidence for stray light is expected to fall within the range of 20-22 degrees, another structure geometry can be selected. Exemplary results of using another geometry are shown in FIG. 7

FIG. 7 provides a plot 700 showing the results of using a half-sawtooth half curved geometry to control stray light in an optical system. In particular, plot 700 indicates the intensity of light 732 received at an image plane relative to horizontal input angles 734 of stray light beams when using a half-sawtooth half-curved geometry having shark fin shaped ridges. Horizontal input angles 734 are indicated in terms of degrees where the degrees indicate the angle of incidence of an incoming stray light beam, where the angle of incidence is the angle between the stray light beam and an interior surface of an optical housing. Plot 700 shows that with the half-sawtooth half curved structure geometry, the amount of stray light reaching the image plane remains relatively low across all horizontal input angles 734.

In the examples of FIGS. 6 and 7, the intensity of light 632 and 732 are indicated in terms of watts per square centimeter. It should also be understood that depending on the type of optical system, embodiments can employ detectors configured to measure power, or intensity of light in other units, such as, for example, watts per square meter. Similarly, although FIGS. 6 and 7 include respective ranges between 0 and 35 degrees for horizontal input angles 634 and 734, it is to be understood that additional embodiments can measure stray light beams having smaller or larger ranges of input angles.

Figure 8:
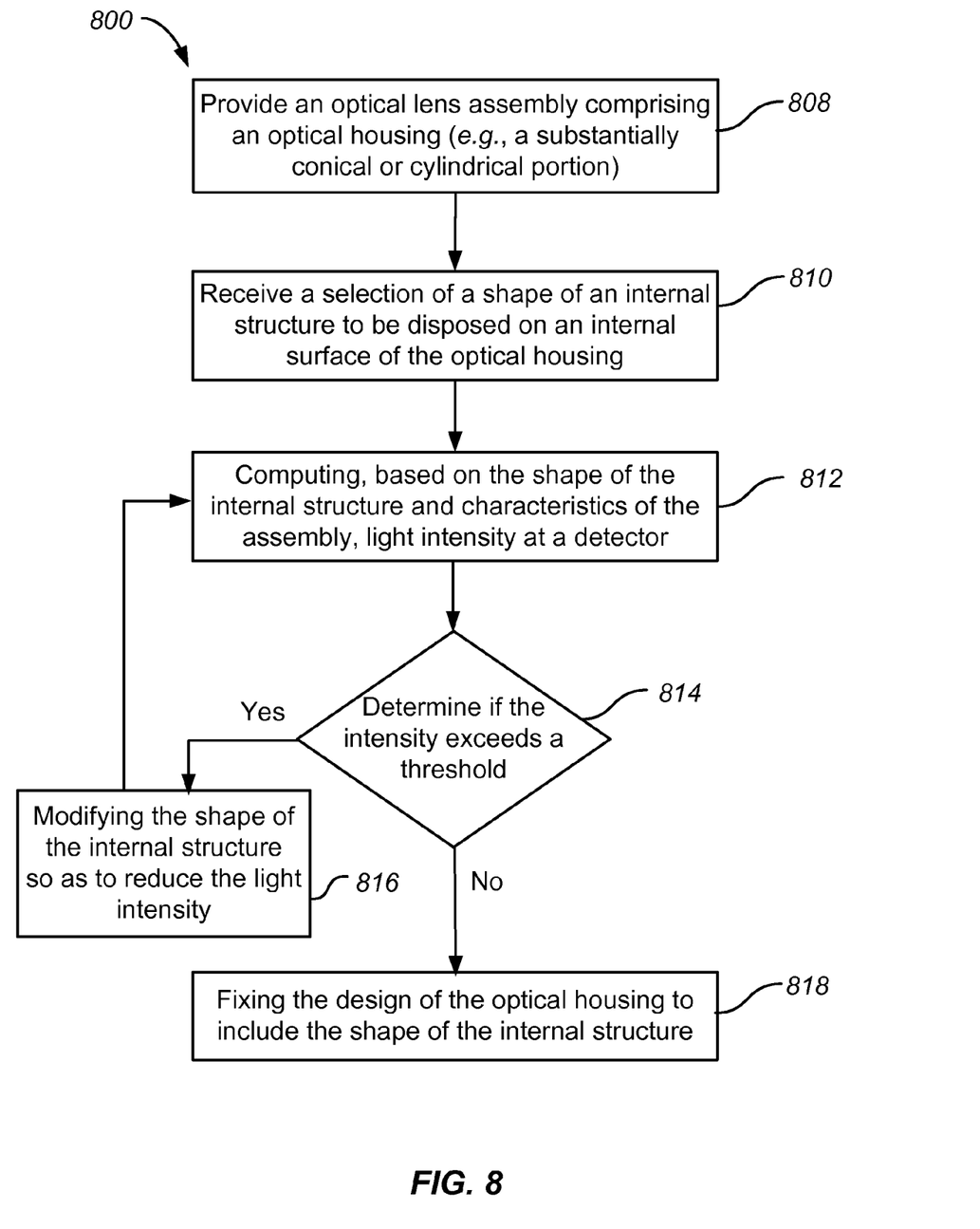
FIG. 8 is a simplified flowchart illustrating a method of designing internal structures for controlling stray light reflections according to an embodiment of the present invention.

FIG. 8 depicts an example flow chart of a method for designing internal structures for controlling stray light reflections within an optical system, according to embodiments. In particular, FIG. 8 illustrates steps of a method 800 for determining an optimum shape of internal structures, wherein method 800 takes into account the shapes of various optical elements of a given optical system. The determined structure shape or geometry is dependent on the shape of the optical elements, including the shapes of lenses, the shape of an optical housing or a lens barrel, the shape and dimensions of a spacer, and/or shapes of other optical elements included in the optical system. By taking into account the properties and characteristics of the optical components, method 800 is able to determine an internal structure for the optical housing that will best control stray light reflections within the optical system.

Method 800 begins at step 808 where an optical lens assembly is provided. The assembly provided in this step comprises an optical housing. In embodiments, the optical lens assembly provided in this step can also include optical elements, such as, for example, one or more lenses, mirrors, prisms, gratings or other optical elements that can have an influence on stray light. In the example of FIG. 8, the optical housing can be substantially conical or cylindrical. Method 800 then proceeds to step 810 where a selection of a shape of an internal structure is received. As shown, the selected shape received in step 810 is to be disposed on an internal surface of the optical housing. In an embodiment, step 810 can comprise receiving a selection of one of a plurality of predefined shapes having respective, predetermined surface features. According to embodiments, the plurality of predefined shapes include one or more of the structure geometries shown in FIGS. 1A-5. After the selection is received, control is passed to step 812.

In step 812, light intensity is computed. In the exemplary embodiment provided in FIG. 8, the light intensity is computed as a result of the shape of the internal structure selected in step 810 and characteristics of the assembly provided in step 808. As shown, the computation can be performed by measuring light intensity at a detector. In certain embodiments, step 812 is performed by providing input light beams (i.e., stray light beams) at various angles and computing respective light intensities for each of the various angles. Step 812 can comprise computing an aggregate, overall light intensity across a given range of input light angles. In additional or alternative embodiments, step 812 can be performed by simulating the direction and spread of reflected stray light beams. For example, step 812 can comprise performing computer simulations wherein light intensity is computed based on the shape of the selected internal structure and known characteristics of the provided assembly. After the light intensity is computed, method 800 proceeds to step 814.

Next, in step 814, a determination is made as to whether a light intensity computed in step 812 exceeds a threshold. According to embodiments, the threshold is a tunable value. In an embodiment, the threshold can be compared to an aggregate, overall light intensity computed in step 812. In accordance with additional or alternative embodiments, step 814 can comprise comparing the threshold to a plurality of computed light intensities corresponding to various light beam angles. If it is determined that a light intensity exceeds the threshold, control is passed to step 816. Otherwise, the light intensity does not exceed the threshold and control is passed to step 818.

In step 816, the shape of the internal structure is modified. The modification performed in this step is done in order to reduce stray light intensity. In an embodiment, this step can comprise receiving a selection of another shape differing from the shape previously selected in step 810. After the shape is modified, control is passed back to step 812 where light intensity is re-computed based on the modified shape. In certain embodiments, step 816 can be performed by simulating modifications to the previously selected shape. For example, step 816 can comprise invoking computer software to make alterations to a previously selected internal structure and then providing properties of the modified shape as input to step 812. According to an embodiment, steps 812-816 are iterated until the computed light intensity does not exceed the threshold.

In step 818, the design of the optical housing is fixed to include the shape of the internal structure. This completes method 800 according to one example embodiment. In additional or alternative embodiments, additional steps can be performed to implement the designed optical housing. For example, method 800 can be expanded to include further steps for fabricating an optical housing according to the design resulting from completing steps 808-818. Such a method can comprise forming a pattern on an interior surface of the optical housing, wherein the pattern comprises the internal structure.

It should be appreciated that the specific steps illustrated in FIG. 8 provide a particular method of designing internal structures for controlling stray light reflections within an optical system according to an embodiment of the present invention. Other sequences of steps may also be performed according to alternative embodiments. For example, alternative embodiments of the present invention may perform the steps outlined above in a different order. Moreover, the individual steps illustrated in FIG. 8 may include multiple sub-steps that may be performed in various sequences as appropriate to the individual step. Furthermore, additional steps may be added or removed depending on the particular applications. One of ordinary skill in the art would recognize many variations, modifications, and alternatives.

Embodiments of the present invention include a method of fabricating an optical housing. The method includes forming a pattern comprising a predetermined surface feature on an interior surface of the optical housing. The method also includes configuring the predetermined surface feature to control reflections of stray light along an optical path between an aperture at a proximal end of the optical housing and a detector at a distal end of the optical housing.

In an embodiment, the pattern is fabricated on an object, which can be referred to as an "insert" that is inserted into the optical housing. Thus, the method of fabricating an optical housing include embodiments in which the pattern is fabricated directly on the optical housing, as well as on an insert disposed inside the optical housing. In an embodiment, the method includes mounting one or more input optics to the optical housing. For example, the optical housing can be operable to be mated to an objective lens assembly.

According to an embodiment, the predetermined surface feature comprises a series of geometric structures arranged substantially transverse to an optical axis of the optical housing. In exemplary embodiments, the series of geometric structures are characterized by a symmetric pattern. The symmetric pattern can comprise at least one of a sawtooth pattern or a rounded sawtooth pattern, such as, for example, the sawtooth pattern shown in FIG. 2 or the rounded sawtooth pattern shown in FIG. 4. Further, for example, the symmetric pattern can include a seagull pattern, such as, for example the seagull pattern shown in FIG. 6.

In alternative or additional embodiments, the series of geometric structures are characterized by a non-symmetric pattern. For example, an upstream surface facing toward the aperture can be characterized by a first surface feature and a downstream surface facing toward the detector can characterized by a second surface feature differing from the first surface feature. In accordance with these embodiments, the first surface feature can be curved and the second surface feature can be substantially planar.

Provided below are descriptions of some devices (and components of those devices) that may be used in the systems and methods described above. These devices may be used, for instance, to receive, transmit, process, and/or store data related to any of the functionality described above. As will be appreciated by one of ordinary skill in the art, the devices described below may have only some of the components described below, or may have additional components.

Figure 9:
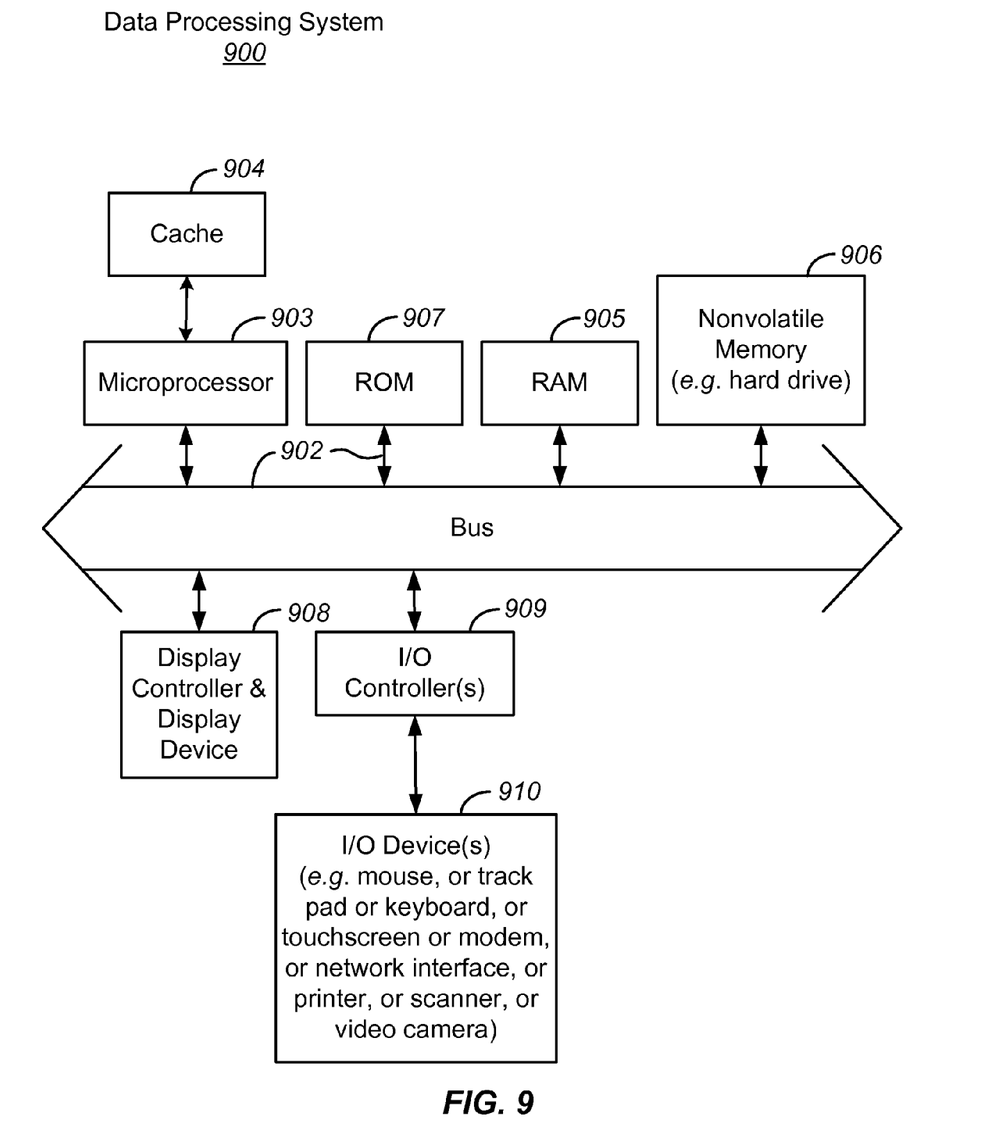
FIG. 9 depicts an example block diagram of a data processing system upon which the disclosed embodiments may be implemented.

FIG. 9 depicts an example block diagram of a data processing system upon which the disclosed embodiments may be implemented. Embodiments of the present invention may be practiced with various computer system configurations such as hand-held devices, microprocessor systems, microprocessor-based or programmable user electronics, minicomputers, mainframe computers and the like. For example, steps of the method 800 described above with reference to FIG. 8 can be carried out by the data processing system 900 shown in FIG. 9. The embodiments can also be practiced in distributed computing environments where tasks are performed by remote processing devices that are linked through a wire-based or wireless network. FIG. 9 shows one example of a data processing system, such as data processing system 900, which may be used with the present described embodiments. Note that while FIG. 9 illustrates various components of a data processing system, it is not intended to represent any particular architecture or manner of interconnecting the components as such details are not germane to the techniques described herein. It will also be appreciated that network computers and other data processing systems which have fewer components or perhaps more components may also be used. The data processing system of FIG. 9 may, for example, be a personal computer (PC), workstation, tablet, smartphone or other hand-held wireless device, or any device having similar functionality.

As shown, the data processing system 900 includes a system bus 902 which is coupled to a microprocessor 903, a Read-Only Memory (ROM) 907, a volatile Random Access Memory (RAM) 905, as well as other nonvolatile memory 906. In the illustrated embodiment, microprocessor 903 is coupled to cache memory 904. System bus 902 can be adapted to interconnect these various components together and also interconnect components 903, 907, 905, and 906 to a display controller and display device 908, and to peripheral devices such as input/output ("I/O") devices 910. Types of I/O devices can include keyboards, modems, network interfaces, printers, scanners, video cameras, or other devices well known in the art. Typically, I/O devices 910 are coupled to the system bus 902 through I/O controllers 909. In one embodiment, the I/O controller 909 includes a Universal Serial Bus ("USB") adapter for controlling USB peripherals or other type of bus adapter.

RAM 905 can be implemented as dynamic RAM ("DRAM") which requires power continually in order to refresh or maintain the data in the memory. The other nonvolatile memory 906 can be a magnetic hard drive, magnetic optical drive, optical drive, DVD RAM, or other type of memory system that maintains data after power is removed from the system. While FIG. 9 shows that nonvolatile memory 906 as a local device coupled with the rest of the components in the data processing system, it will be appreciated by skilled artisans that the described techniques may use a nonvolatile memory remote from the system, such as a network storage device coupled with the data processing system through a network interface such as a modem or Ethernet interface (not shown).

With these embodiments in mind, it will be apparent from this description that aspects of the described techniques may be embodied, at least in part, in software, hardware, firmware, or any combination thereof. It should also be understood that embodiments can employ various computer-implemented functions involving data stored in a data processing system. That is, the techniques may be carried out in a computer or other data processing system in response executing sequences of instructions stored in memory. In particular, the instructions, when executed, enable microprocessor 903 to implement the processes of the present invention, such as the steps in the method 800 illustrated by the flowchart of FIG. 8, discussed above. In various embodiments, hardwired circuitry may be used independently, or in combination with software instructions, to implement these techniques. For instance, the described functionality may be performed by specific hardware components containing hardwired logic for performing operations, or by any combination of custom hardware components and programmed computer components. The techniques described herein are not limited to any specific combination of hardware circuitry and software.

Embodiments herein may also be in the form of computer code stored on a computer-readable medium. Computer-readable media can also be adapted to store computer instructions, which when executed by a computer or other data processing system, such as data processing system 900, are adapted to cause the system to perform operations according to the techniques described herein. Computer-readable media can include any mechanism that stores information in a form accessible by a data processing device such as a computer, network device, tablet, smartphone, or any device having similar functionality. Examples of computer-readable media include any type of tangible article of manufacture capable of storing information thereon such as a hard drive, floppy disk, DVD, CD-ROM, magnetic-optical disk, ROM, RAM, EPROM, EEPROM, flash memory and equivalents thereto, a magnetic or optical card, or any type of media suitable for storing electronic data. Computer-readable media can also be distributed over a network-coupled computer system, which can be stored or executed in a distributed fashion.

Throughout the foregoing description, for the purposes of explanation, numerous specific details were set forth in order to provide a thorough understanding of the invention. It will be apparent, however, to persons skilled in the art that these embodiments may be practiced without some of these specific details. Accordingly, the scope and spirit of the invention should be judged in terms of the claims which follow as well as the legal equivalents thereof.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. An optical system comprising:
   an aperture having an optical axis passing therethrough;
   one or more optical elements disposed along an optical path;
   a detector disposed along the optical path; and
   an optical housing disposed between the aperture and the detector, wherein an interior surface of the optical housing includes a predetermined surface feature comprising a series of geometric structures characterized by a non-symmetric pattern having an upstream surface facing toward the aperture and a downstream surface facing toward the detector, wherein the upstream surface has a convex surface shape, and the downstream surface has a planar surface shape, and wherein the upstream surface and the downstream surface meet at a shark fin shaped ridge, the predetermined surface feature being adapted to control reflections of stray light along the optical path between the aperture and the detector.

2. The optical system of claim 1 wherein the one or more optical elements comprise one or more objective lenses.

3. The optical system of claim 1 wherein the series of geometric structures is arranged substantially transverse to the optical axis.

4. The optical system of claim 1 wherein the optical housing is operable to be mated to an objective lens assembly.

5. The optical system of claim 1, further comprising one or more input optics mounted to the optical housing.

\* \* \* \* \*